Patented Dec. 9, 1930

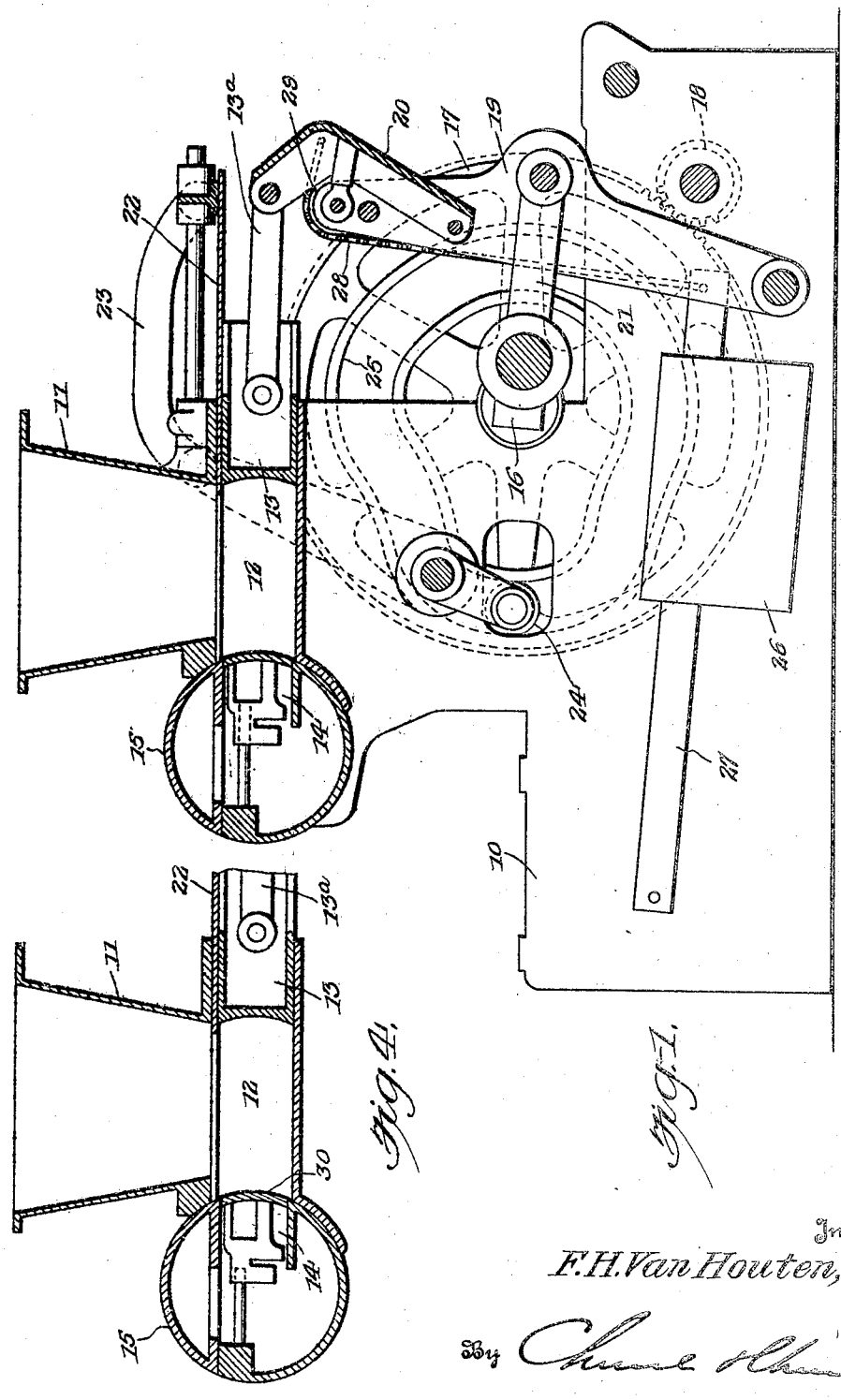

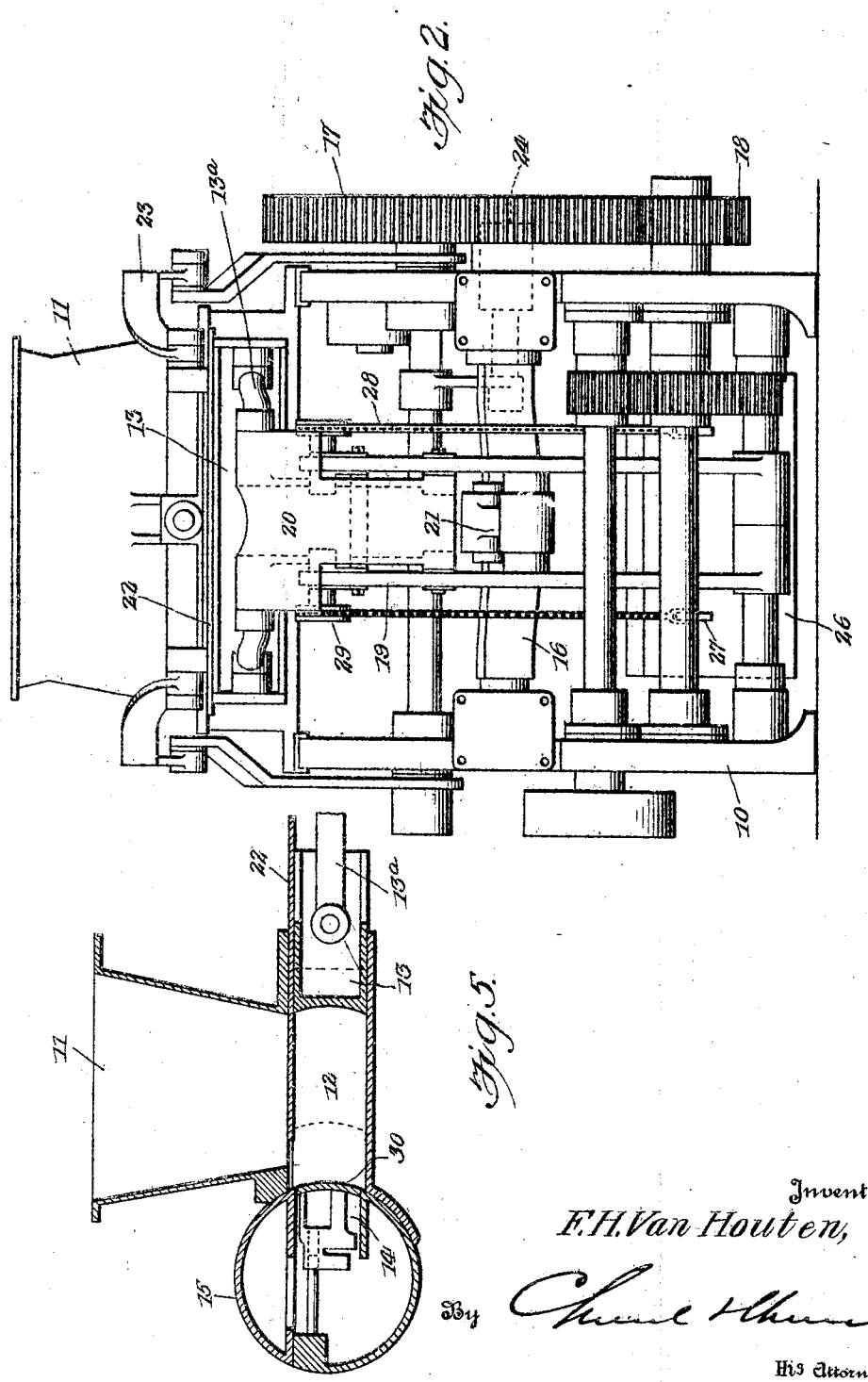

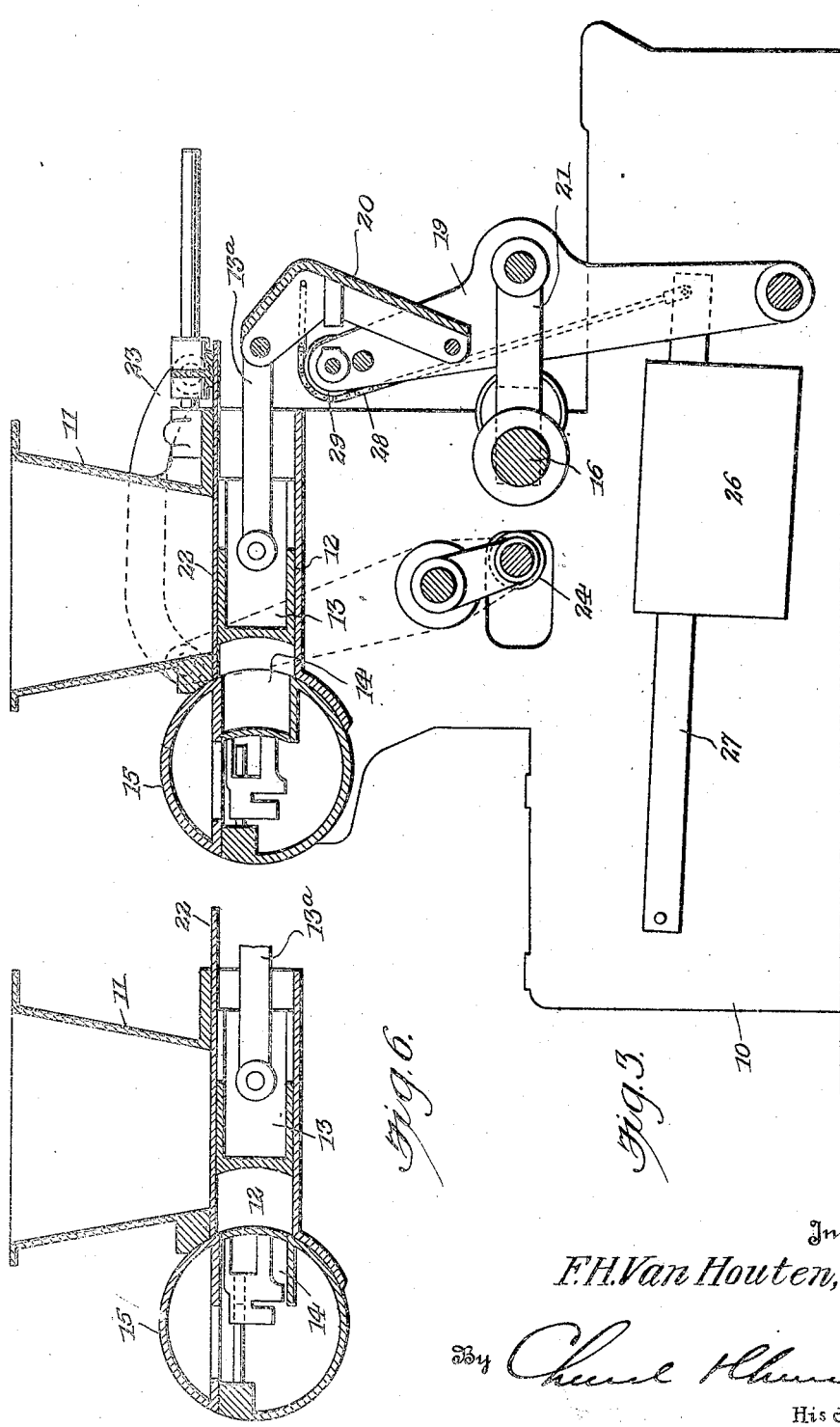

1,784,559

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH-DIVIDING APPARATUS

Application filed June 25, 1929. Serial No. 373,566.

This invention relates to an improved method and apparatus for automatically dividing masses of dough into individual lumps.

The primary object of the invention is to secure a more accurate scaling of the dough and consists generally in accumulating a predetimined amount of dough in a compression box or other space, and then delivering or forcing such predetermined quantity of dough into one or more chambers or measuring pockets in which the individual lumps are formed.

In the type of apparatus adapted for illustrating the present method, the mass of dough to be divided is deposited in a suitable hopper and portions thereof advanced to a cylinder containing measuring pockets or chambers by a reciprocatory plunger, provision being made whereby pressure exerted on the dough by said plunger will be maintained substantially uniform so as to effect a uniform distribution and compression of the dough in the measuring pockets. In connection with this apparatus, the invention further contemplates means for permitting the plunger to make its full stroke without operating the pressure creating and maintaining means when no dough is present. In other words, it is designed to save wear and tear on the machine during its operation when there is no dough present, and to avoid the consumption of power by operation of the pressure maintaining or creating devices when there is no dough to resist forward movement of the plunger.

With these and other objects in view, the invention consists in certain details of construction and combinations and arrangements of parts, all as will be hereinafter more fully described and the novel features thereof particularly pointed out in the appended claims.

In the accompanying drawings:

Figure 1 is a side elevation of a preferred form of apparatus;

Fig. 2 is an end elevation;

Fig. 3 is a view similar to Figure 1, illustrating the plunger in its advanced position, the cams and similar driving connections being omitted;

Figs. 4, 5 and 6 are a series of detail views diagrammatically illustrating the method of the present invention.

In the machine illustrated in the drawings, only those parts which are necessary for a complete understanding of the invention are shown and they embody essentially a main frame 10, surmounted by a hopper 11, having below it a channel or compression box 12 in which a reciprocatory plunger 13 operates to advance portions of the dough into the measuring pockets 14 in an intermittently rotated measuring head or cylinder 15. Journaled in the main frame of the machine is an operating shaft 16 which at one end carries a large wheel 17 driven from a pinion or small wheel 18, journaled in the frame to which power is supplied from a suitable source. Pivoted near the bottom of frame 10, at each side of the machine, is an oscillatory member preferably composed of two sections 19, 20, section 19 being the one pivoted in the frame and section 20 being pivotally attached to said section 19 and pivotally connected to the plunger 13 by rods 13a. Cranks 21 arranged eccentrically on wheel 17 are connected to sections 19 of the oscillatory members for the purpose of rocking the same on their pivotal centers. As is customary, there is a knife 22 immediately above plunger 13, adapted to be reciprocated back and forth across the opening between hopper 11 and compression box 12 for the purpose of severing dough in the box from the main mass of dough in the hopper. This knife is reciprocated by means of arms 23 which are connected to the knife at one end and at whose opposite ends there are cam rollers 24 arranged in cam groove 25 in wheel 17, each arm 23 being pivoted on the frame intermediate its ends, whereby it will be rocked on its pivotal center during rotation of wheel 17.

In order that dough in the compression box will be forced into the measuring pockets or cylinder 15 with a regulable, uniform pressure, there is a loose connection between the section 20 of the oscillatory member, which imparts the reciprocatory motion to plunger 13 and a compression weight 26. The weight 26 is preferably slidably mounted on bars 27, pivoted on frame 10, and said bars are connected by chains 28 with section 20 of the oscillatory member, said chains passing over rollers 29 on sections 19 of the oscillatory members.

With this arrangement, compression weight 26 will be lifted only when there is dough in the compression box to restrain the advance movement of plunger 13. That is, in the absence of dough in compression box 12, both of sections 19, 20 of the oscillatory members will rock as a unit and have no effect whatever, so far as elevating weight 26 is concerned. On the other hand, if there is a quantity of dough in compression box 12, there is a relative movement between sections 19, 20 of each oscillatory member when the dough in said box retards the movement of plunger 13, this relative movement of sections 19, 20 being permitted by reason of the loose connection formed by the chains 28. By thus permitting the plunger 13 to reciprocate without elevating weight 26, when there is no dough in compression box 12, there is considerable saving in wear and tear on the machine, as well as the power consumed in operating the machine. Furthermore, by having the weight carried on pivoted bars 27, it may be adjusted toward or from the pivotal centers of said bars so as to vary the pressure exerted on the dough that is being forced from the compression box into the measuring pockets of cylinders 15.

It will be appreciated that compression box 12 is rarely, if ever, completely filled with dough falling from the hopper 11. The amount of dough moving into the compression box depends almost entirely upon the consistency of the dough being handled by the machine, a very soft dough filling the compression box more completely than a hard dough. Due to this inequality in the amount of dough moving to the compression box with each successive operation of the machine, the successive portions of dough forced from the box into the measuring pockets are placed under variable pressures. That is, the larger the quantity of dough in the compression box, the greater likelihood there will be of the same being less evenly distributed and less uniformly packed, so to speak, in the measuring pockets.

In view of this, there is proposed, in the present instance, a method of dividing dough wherein there is a predetermined quantity of dough in the compression box, each time the plunger advances to force the dough into the measuring pockets. More specifically, this method consists in only partially closing the opening between the hopper and compression box during the initial forward movement of the plunger, so that a portion of the dough in the compression box may be forced back into the hopper until there is left in the box a predetermined quantity of dough, after which the opening between the hopper and compression box is completely closed and the plunger fully advanced to force the dough then remaining in the box into the measuring pockets. Preferably, the predetermined quantity of dough remaining in the box is slightly in excess of the capacity of the pockets in the cylinder 15, but this need not necessarily be so. With such a method, it is a matter of no consequence whether dough moving from the hopper to the compression box is hard or soft, because regardless of how much dough is in the compression box over and above the predetermined quantity, such excess dough will be forced back into the hopper before the plunger fully advances to force dough from the box into the pockets. The preferred arrangement for practicing this method consists in plunger 13 and knife 22 being so timed in their movements as that they would move as illustrated in Figs. 4 to 6. As shown in Fig. 4, both the knife and plunger are fully retracted and the ejecting plungers 30 in the measuring pockets are shown advanced. During the first portion of the cycle of operations of the machine, knife 22 moves forward considerably in advance of plunger 13, so as to sever the major portion of the dough in the compression box, the opening between said box and the hopper being left partially open, as shown in Fig. 5. Knife 22 remains in this position until plunger 13 moves forward to the position indicated in dotted lines in Fig. 5, and it is during this portion of the movement of plunger 13 that any dough in excess of the predetermined quantity desired in the pockets is forced back into the hopper through the opening left by not having fully advanced knife 22. After plunger 13 has moved to the position shown in dotted lines in Fig. 2, knife 22 is then fully advanced and the opening between the hopper and box completely closed, whereupon, plunger 13 is also further advanced to force the dough then remaining in the box into the pockets of the measuring cylinder. At this juncture, or rather, at the time the dough has been forced into the measuring pockets under the desired pressure, the compression weight 26 is elevated. Due to the fact that whenever dough is being fed into the compression box, there must necessarily be a predetermined quantity of dough in said box just previous to the moment the plunger operates to force the dough from said box into the pockets, there is obtained a much more accurate scaling of the dough.

What is claimed is:

1. The method of dividing dough which consists in delivering a quantity of dough from a hopper or reservoir to a compression box, moving a closure partially across the opening between said hopper and box, compressing the dough in said box and simultaneously returning a portion thereof to said hopper, and then fully closing said opening with said closure and further compressing the dough remaining in said box in the pocket of a dough receiving member.

2. The method of forming accurately measured lumps of dough comprising feeding dough from a storage space into a compression space, partially severing the dough in the compression space from that remaining in the storage space with a dough severing element, compressing the dough in the compression space and simultaneously returning the excess dough therefrom to the storage space, completing the severing of the dough in the compression space from that in the storage space with said severing element, and delivering the dough from the compression space into a lump receiving chamber.

3. In a dough dividing apparatus, the combination of a compression box, a hopper opening into said box, a head having a measuring pocket therein, a knife adapted to close the opening between the box and hopper, a reciprocatory plunger for compressing dough delivered from the hopper to the box in said box and transferring it to the measuring pocket, means for initially moving said knife to only partially close the opening between the hopper and box until the plunger has been partially advanced in said box and for subsequently moving said knife to fully close said opening before and during the further advance of said plunger.

4. In a dough dividing apparatus, the combination of a compression box, a hopper opening into said box, a head having a measuring pocket, a knife slidable across said opening to close the same, a reciprocatory plunger in said box to compress dough therein and transfer it to said pocket, means for advancing said knife across said opening with an intermittent movement and means for advancing said plunger in said box with a continuous movement.

5. In a dough dividing apparatus, the combination of a compression box, a hopper opening into said box, a head having a measuring pocket, a knife slidable across said opening to close the same, a reciprocatory plunger in said box to compress dough therein and transfer it to said pocket, means operable simultaneously for advancing said knife across said opening with an intermittent movement and means for advancing said plunger in said box with a continuous movement.

6. In a dough dividing apparatus, the combination of a compression box, a hopper opening into said box, a head having a measuring pocket, a reciprocatory knife adapted to close the opening between the box and hopper, a reciprocatory plunger in said box for compressing dough therein and transferring it to said pocket, means for advancing the plunger in said box with a continuous movement, and means for advancing the knife across said opening with an intermittent motion, the initial advance of said knife being at a rate of speed in excess of that of the advancing plunger.

FRANK H. VAN HOUTEN.